(12) United States Patent
Moon et al.

(10) Patent No.: US 11,226,541 B2
(45) Date of Patent: Jan. 18, 2022

(54) METHOD FOR APPLYING DRIVING VOLTAGE FOR LIQUID LENS, CAMERA MODULE, AND OPTICAL INSTRUMENT INCLUDING THE MODULE

(71) Applicant: LG INNOTEK CO., LTD., Seoul (KR)

(72) Inventors: Young Seop Moon, Seoul (KR); Hoon Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 324 days.

(21) Appl. No.: 16/477,667

(22) PCT Filed: Jan. 12, 2018

(86) PCT No.: PCT/KR2018/000603
§ 371 (c)(1),
(2) Date: Jul. 12, 2019

(87) PCT Pub. No.: WO2018/131925
PCT Pub. Date: Jul. 19, 2018

(65) Prior Publication Data
US 2019/0361322 A1    Nov. 28, 2019

(30) Foreign Application Priority Data

Jan. 13, 2017 (KR) .................. 10-2017-0006224
Apr. 11, 2017 (KR) .................. 10-2017-0046984

(51) Int. Cl.
*G02B 26/00* (2006.01)
*G03B 13/36* (2021.01)
*G02B 3/14* (2006.01)

(52) U.S. Cl.
CPC .............. *G03B 13/36* (2013.01); *G02B 3/14* (2013.01); *G02B 26/004* (2013.01)

(58) Field of Classification Search
CPC ........ G03B 17/12; G03B 13/32; G03B 13/36; H04N 5/232; H04N 5/225; G02B 26/004; G02B 3/14; G02B 27/646
(Continued)

(56) References Cited

U.S. PATENT DOCUMENTS

2012/0099205 A1* 4/2012 Bae ............... G02B 26/005
                                                         359/620
2015/0268333 A1    9/2015 Schneider et al.

FOREIGN PATENT DOCUMENTS

CN    101910904 A    12/2010
CN    101911671 A    12/2010
(Continued)

*Primary Examiner* — James C. Jones
(74) *Attorney, Agent, or Firm* — Birch, Stewart, Kolasch & Birch, LLP

(57) ABSTRACT

A camera module according to an embodiment of the present invention includes a first plate including a cavity formed therein to accommodate a conductive liquid and a non-conductive liquid; an electrode unit disposed on the first plate, the electrode unit being electrically connected to an external power source to change an interface between the conductive liquid and the non-conductive liquid; an insulation unit disposed on the electrode unit and a control unit controlling a voltage applied to the electrode unit, wherein the electrode unit includes a first electrode and a second electrode electromagnetically interacting with each other to change the interface, wherein the first electrode includes a plurality of electrode sectors arranged sequentially in a clockwise direction with respect to an optical axis, and wherein the control unit performs control so as to apply voltages to driving electrodes by rotation in a clockwise direction or in a counterclockwise direction.

21 Claims, 8 Drawing Sheets

(58) Field of Classification Search
USPC .......................................................... 359/290
See application file for complete search history.

(56) References Cited

FOREIGN PATENT DOCUMENTS

| | | | |
|---|---|---|---|
| CN | 102272653 | A | 12/2011 |
| JP | 2006-078843 | A | 3/2006 |
| JP | 2009-037711 | A | 2/2009 |
| JP | 2007-121846 | A | 5/2017 |
| KR | 10-2007-0095525 | A | 10/2007 |
| KR | 10-2009-0018965 | A | 2/2009 |
| KR | 10-2016-0063238 | A | 6/2016 |
| KR | 10-1660410 | B1 | 9/2016 |
| WO | WO 2009/074684 | A1 | 6/2009 |

* cited by examiner

[FIG. 1]
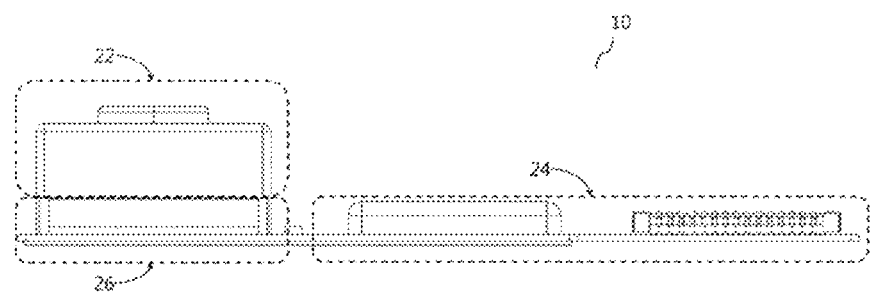
[FIG. 2]
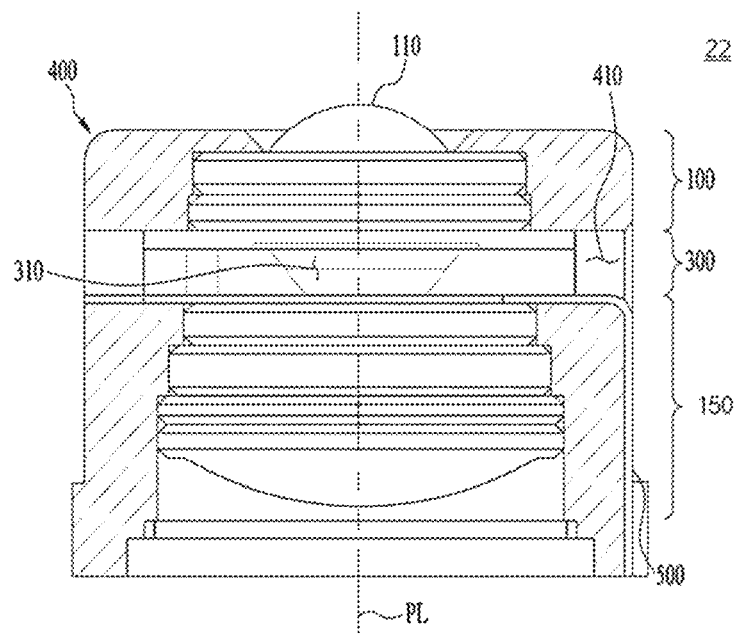

[FIG. 3]
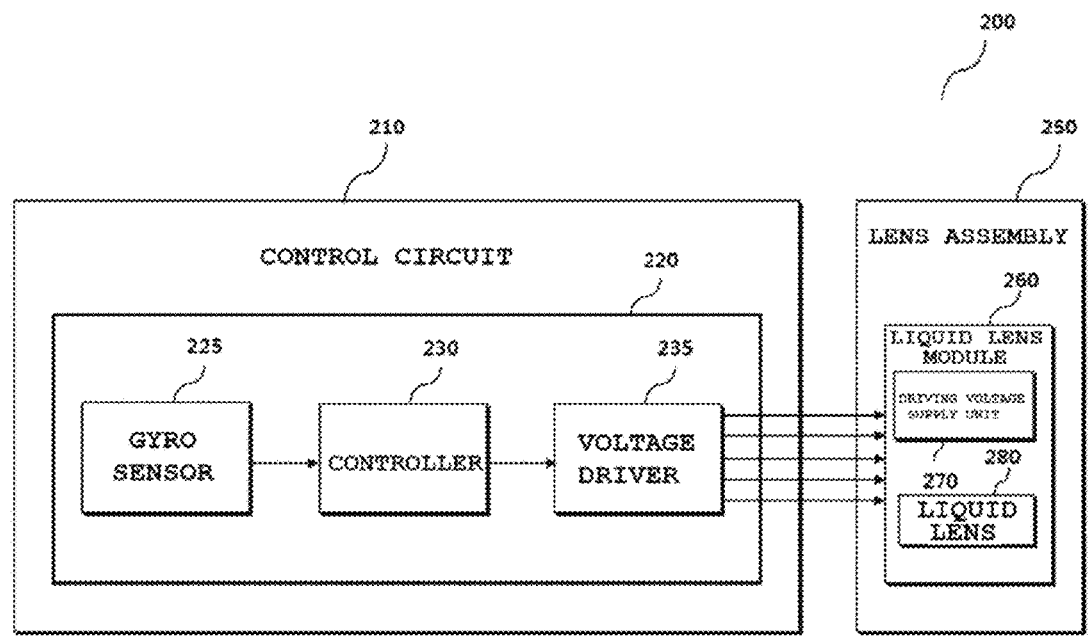
[FIG. 4]
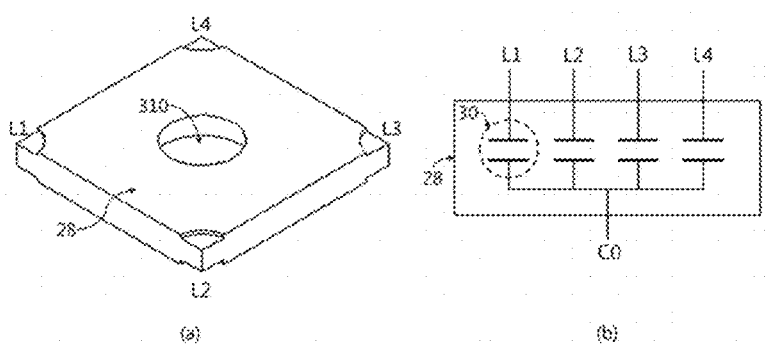

[FIG. 5]
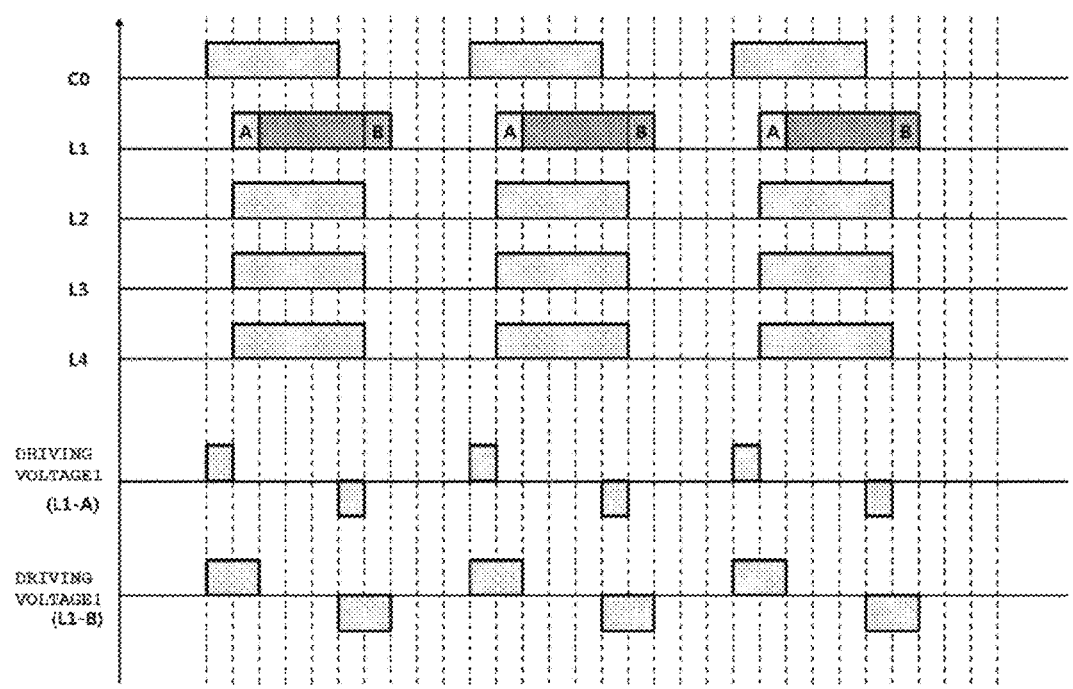

[FIG. 6]
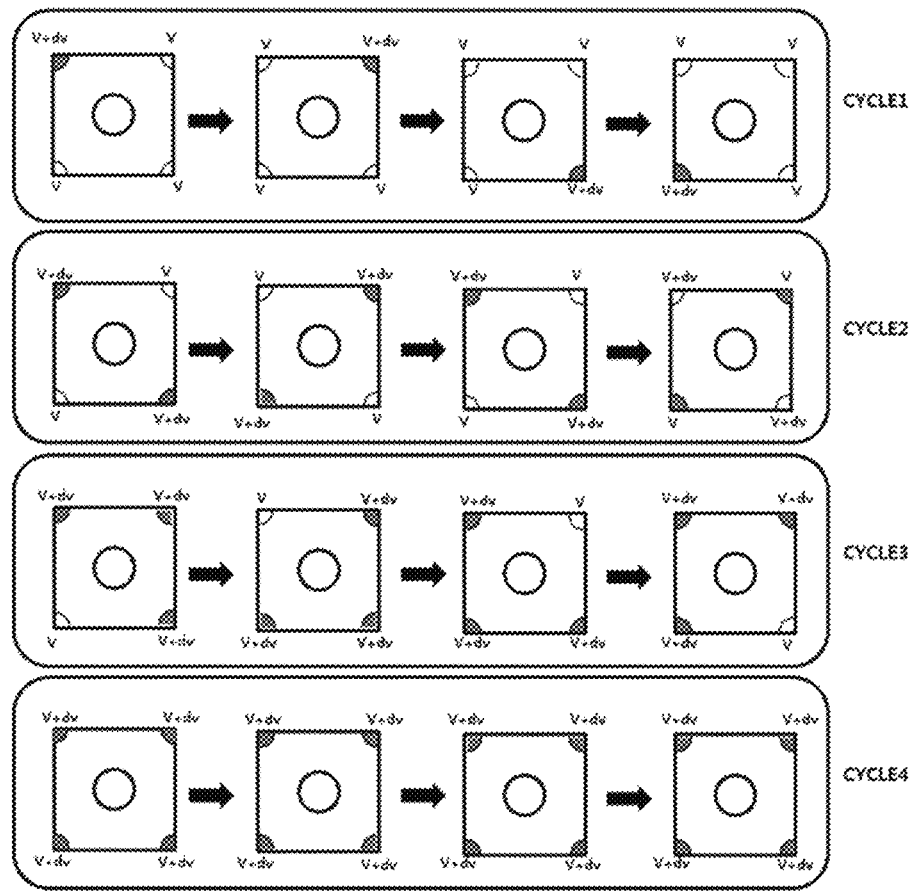

[FIG. 7]
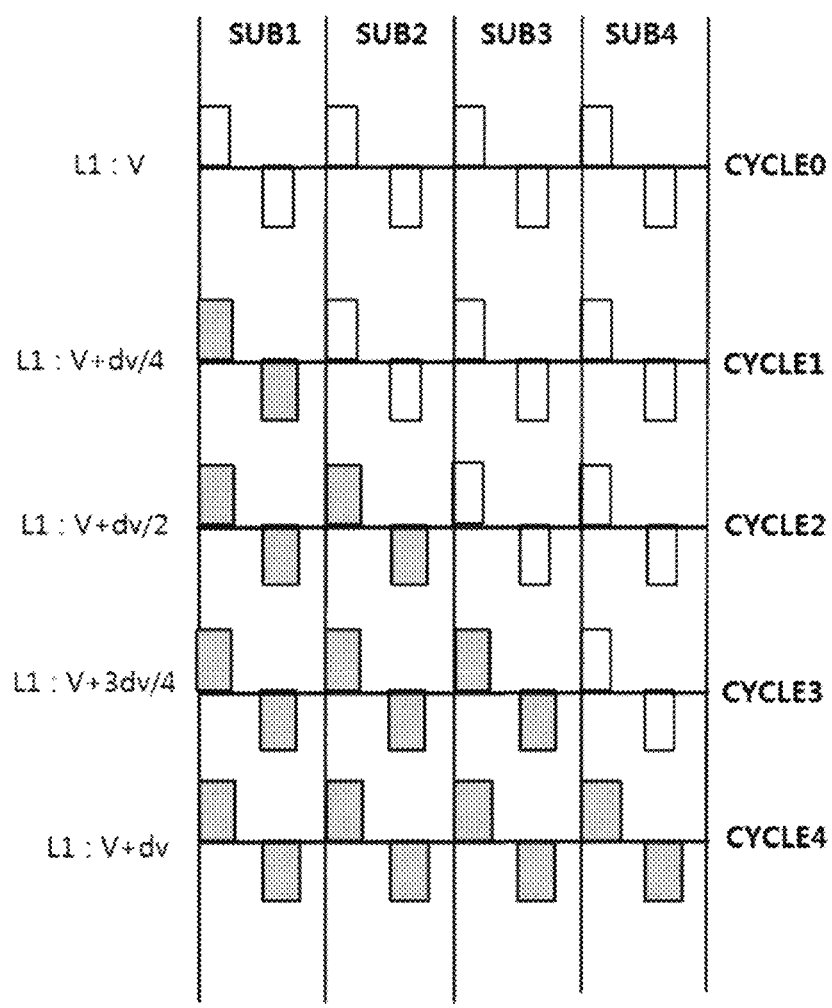

[FIG. 8]
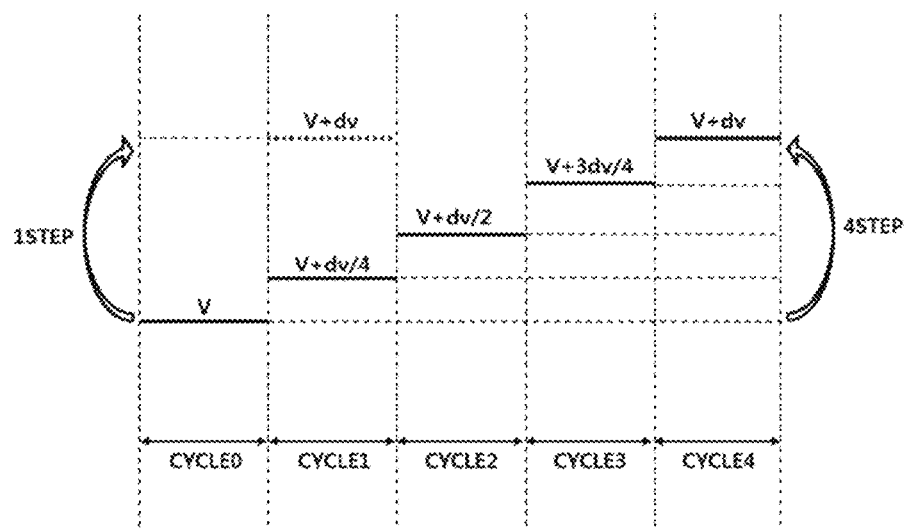

[FIG. 9]
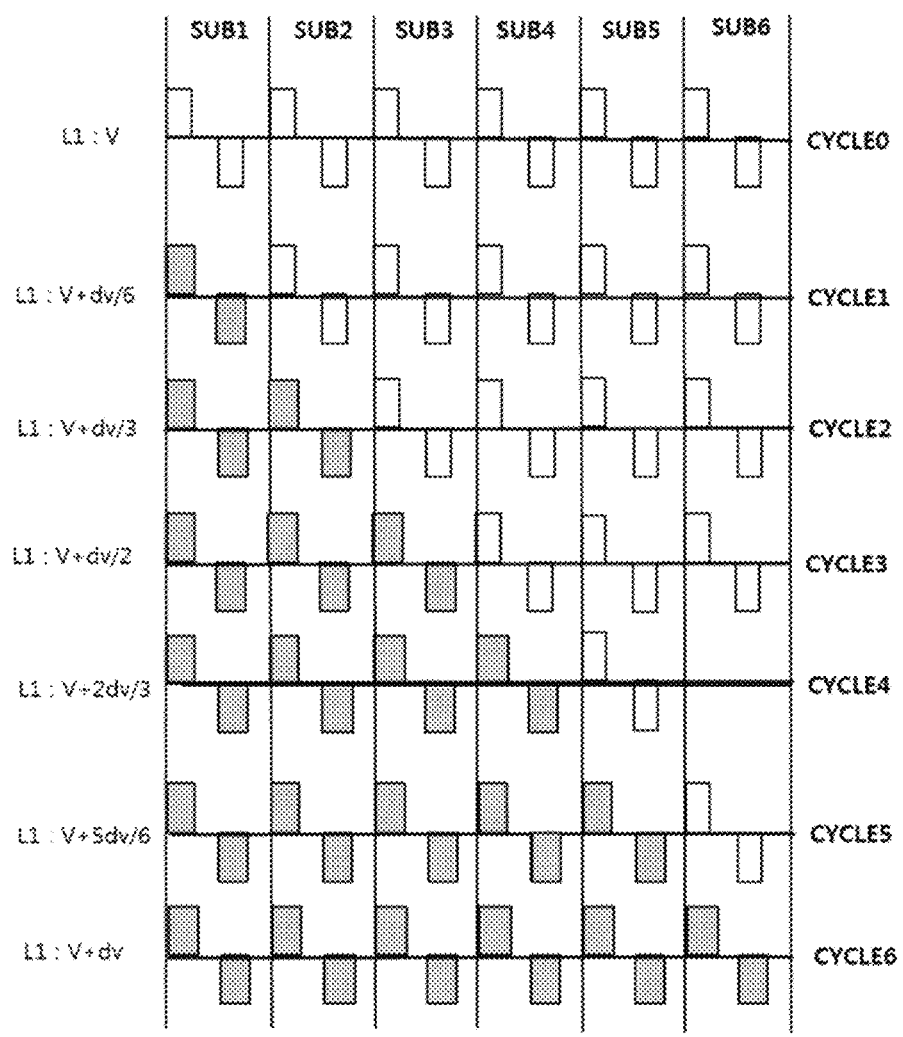

[FIG. 10]
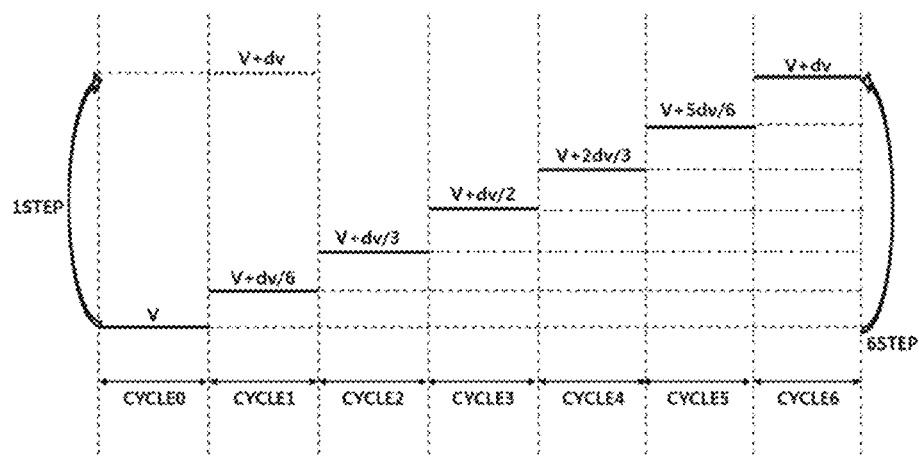

METHOD FOR APPLYING DRIVING VOLTAGE FOR LIQUID LENS, CAMERA MODULE, AND OPTICAL INSTRUMENT INCLUDING THE MODULE

CROSS REFERENCE TO RELATED APPLICATIONS

This application is the National Phase of PCT International Application No. PCT/KR2018/000603, filed on Jan. 12, 2018, which claims priority under 35 U.S.C. 119(a) to Patent Application No. 10-2017-0006224, filed in Republic of Korea on Jan. 13, 2017 and Patent Application No. 10-2017-0046984, filed in Republic of Korea on Apr. 11, 2017, all of which are hereby expressly incorporated by reference into the present application.

TECHNICAL FIELD

The present disclosure relates to a method of applying a driving voltage to a liquid lens, a camera module, and an optical device including the module. More particularly, the present disclosure relates to a method of applying a driving voltage to a liquid lens enabling adjustment of a focal length using electrical energy, a camera module, and an optical device including the module.

BACKGROUND ART

People who use portable devices demand optical devices that have high resolution, are small, and have various photographing functions (an optical zoom-in/zoom-out function, an auto-focusing (AF) function, a handshake compensation or optical image stabilization (OIS) function, etc.). Such photographing functions may be realized by directly moving a plurality of lenses that are combined. In the case in which the number of lenses is increased, however, the size of an optical device may be increased.

The auto-focusing and handshake compensation functions are performed by tilting or moving a lens module including a plurality of lenses, which are fixed to a lens holder in the state in which the optical axes of the lens are aligned, along the optical axis or in a direction perpendicular to the optical axis. An additional lens moving apparatus is used to move the lens module. However, the lens moving apparatus has high power consumption, and an additional cover glass needs to be provided separately from the camera module in order to protect the lens moving apparatus, thus leading to an increase in the overall thickness of an optical device.

Therefore, research has been conducted on a liquid lens configured to electrically adjust the curvature of an interface between two kinds of liquid in order to perform auto-focusing and handshake compensation functions.

DISCLOSURE

Technical Problem

The present disclosure provides a method of applying a driving voltage to a liquid lens, which enables improvement of auto-focusing resolution without an increase in power consumption, a camera module, and an optical device including the module.

However, the objects to be accomplished by the disclosure are not limited to the above-mentioned objects, and other objects not mentioned will be clearly understood by those skilled in the art from the following description.

Technical Solution

In one embodiment, a camera module may include a first plate including a cavity formed therein to accommodate a conductive liquid and a non-conductive liquid, an electrode unit disposed on the first plate and electrically connected to an external power source to change an interface between the conductive liquid and the non-conductive liquid, an insulation unit disposed on the electrode unit to prevent contact with the non-conductive liquid, and a control unit controlling a voltage applied to the electrode unit. The electrode unit may include a first electrode and a second electrode electromagnetically interacting with each other to change the interface between the conductive liquid and the non-conductive liquid, the first electrode may include a plurality of electrode sectors arranged sequentially in a clockwise direction with respect to an optical axis, and the control unit may perform control so as to apply voltages to driving electrodes corresponding to the electrode sectors by rotation in a clockwise direction or in a counterclockwise direction.

Depending on the embodiment, the control unit may apply a first voltage to at least one of the driving electrodes, and may apply a second voltage, which has a different intensity from the first voltage, to remaining ones of the driving electrodes.

Depending on the embodiment, the second voltage may be higher than the first voltage.

In another embodiment, a method of applying a voltage to a liquid lens may include applying a first voltage to each of $1^{st}$ to $n^{th}$ (n being an integer of 2 or greater) driving electrodes, applying a second voltage to m (m being an integer of 1 to n−1) driving electrodes of the $1^{st}$ to $n^{th}$ driving electrodes and applying a first voltage to remaining n-m driving electrodes, and applying the second voltage to each of the $1^{st}$ to $n^{th}$ driving electrodes. The applying the second voltage to m driving electrodes of the $1^{st}$ to $n^{th}$ driving electrodes and applying the first voltage to remaining n-m driving electrodes may include applying m driving voltages as the second voltage by rotation.

Depending on the embodiment, the second voltage may be the sum of the first voltage and a unit voltage of a voltage driver supplying a driving voltage to the liquid lens.

Depending on the embodiment, in the applying m driving voltages of the $1^{st}$ to $n^{th}$ driving voltages as the second voltage, n sub-cycles may be provided, and at least one of the $1^{st}$ to $n^{th}$ driving voltages may be changed in adjacent ones of the n sub-cycles.

In still another embodiment, a liquid lens may include a conductive liquid and a non-conductive liquid accommodated in a cavity so as to form an interface therebetween, and $1^{st}$ to $n^{th}$ (n being an integer of 2 or greater) driving electrodes configured to control the interface. $1^{st}$ to $n^{th}$ driving voltages respectively applied to the $1^{st}$ to $n^{th}$ driving electrodes may be controlled in respective cycles, each of which includes n sub-cycles. In each of the n sub-cycles, at least one of the $1^{st}$ to $n^{th}$ driving voltages may be applied as a first voltage, m (m being an integer of 1 to n−1) driving voltages of the $1^{st}$ to $n^{th}$ driving voltages may be applied as a second voltage, and the m driving voltages may be applied as the second voltage by rotation.

Depending on the embodiment, the second voltage may be the sum of the first voltage and a unit voltage of a voltage driver supplying a driving voltage to the liquid lens.

Depending on the embodiment, any one of the $1^{st}$ to $n^{th}$ driving voltages may be applied as the second voltage in the m sub-cycles.

Depending on the embodiment, at least one of the $1^{st}$ to $n^{th}$ driving voltages may be changed in adjacent ones of the n sub-cycles.

Depending on the embodiment, the sum of the $1^{st}$ to $n^{th}$ driving voltages applied in each of the n sub-cycles may be maintained at a constant level.

In still another embodiment, an optical device may include the camera module described above, a display unit outputting an image, a battery supplying power to the camera module, and a housing in which the camera module, the display unit, and the battery are mounted.

In still another embodiment, a liquid lens may include a conductive liquid and a non-conductive liquid accommodated in a cavity so as to form an interface therebetween, and n (n being an integer of 2 or greater) individual electrodes and a common electrode configured to control the interface. A first driving voltage, which is applied between the common electrode and any one of the n individual electrodes, may be controlled in respective unit cycles, each of which includes a first sub-cycle and a second sub-cycle. The level of the first driving voltage in the first sub-cycle may be a first voltage, and the level of the first driving voltage in the second sub-cycle may be a second voltage.

Depending on the embodiment, the sum of the number of the first sub-cycles and the number of the second sub-cycles may be X (X being an integer of 2 or greater).

Depending on the embodiment, in one unit cycle, the sum of the driving voltages applied between the n individual electrodes and the common electrode in each of the sub-cycles may be maintained at a constant level.

Depending on the embodiment, if the number of the second sub-cycles of the X sub-cycles is Y in one unit cycle, the average driving voltage in the unit cycle may satisfy the following equation.

Average Driving Voltage in Unit Cycle=First Voltage+(Predetermined Unit Driving Voltage*Y)/X    (Equation)

Here, Predetermined Unit Driving Voltage=Second Voltage−First Voltage

Depending on the embodiment, when the process goes from the first sub-cycle to the second sub-cycle, which is adjacent to the first sub-cycle, the level of the driving voltage applied to at least one of the n individual electrodes may be changed.

Depending on the embodiment, the second voltage may be the sum of the first voltage and the predetermined unit voltage.

Depending on the embodiment, the first driving voltage may have two voltage levels.

Depending on the embodiment, the second voltage may be higher than the first voltage.

In still another embodiment, a camera module may include a liquid lens, which includes a conductive liquid and a non-conductive liquid accommodated in a cavity so as to form an interface therebetween and n (n being an integer of 2 or greater) individual electrodes and a common electrode configured to control the interface, and a control circuit controlling a voltage applied to the n individual electrodes and the common electrode. A first driving voltage, which is applied between the common electrode and any one of the n individual electrodes, may be controlled in respective unit cycles, each of which includes a first sub-cycle and a second sub-cycle. The level of the first driving voltage in the first sub-cycle may be a first voltage, and the level of the first driving voltage in the second sub-cycle may be a second voltage.

In still another embodiment, an optical device may include a camera module, a display unit outputting an image, a battery supplying power to the camera module, and a housing in which the camera module, the display unit, and the battery are mounted.

The above aspects of the present disclosure are only a part of the exemplary embodiments of the present disclosure, and various embodiments based on technical features of the present disclosure may be devised and understood by those skilled in the art from the following detailed description of the present disclosure.

Advantageous Effects

The effects of the device according to the present disclosure will be described below.

According to a method of applying a driving voltage to a liquid lens, a camera module, and an optical device including the module according to an embodiment, it is possible to increase auto-focusing resolution using a unit voltage within a constant output voltage range of a voltage driver.

In addition, an increase in the output voltage range of a voltage driver is not required while increasing auto-focusing resolution, thus leading to a reduction in the amount of power consumed by an optical device.

However, the effects achievable through the disclosure are not limited to the above-mentioned effects, and other effects not mentioned will be clearly understood by those skilled in the art from the following description.

DESCRIPTION OF DRAWINGS

FIG. 1 shows an example of a camera module according to an embodiment.

FIG. 2 shows an example of a lens assembly included in the camera module.

FIG. 3 is a block diagram schematically showing the camera module shown in FIG. 1.

FIG. 4 shows a liquid lens, an interface of which is adjusted in response to a driving voltage.

FIG. 5 is a view showing an example of a voltage supplied to both ends of a liquid lens.

FIG. 6 is a view showing a method of applying a voltage to a liquid lens according to an embodiment.

FIG. 7 is a view showing a method of applying a voltage to a liquid lens according to the embodiment shown in FIG. 6 in terms of one driving electrode.

FIG. 8 is a view showing the effects of the driving voltage applying method according to the embodiment.

FIG. 9 is a view showing a method of applying a voltage to a liquid lens according to another embodiment in terms of one driving electrode.

FIG. 10 is a view showing the effects of the driving voltage applying method according to another embodiment.

BEST MODE

A liquid lens according to a first embodiment may include a conductive liquid and a non-conductive liquid accommodated in a cavity so as to form an interface therebetween, and n (n being an integer of 2 or greater) individual electrodes and a common electrode configured to control the interface. A first driving voltage, which is applied between the common electrode and any one of the n individual electrodes, may be controlled in respective unit cycles, each of which includes a first sub-cycle and a second sub-cycle. The level of the first driving voltage in the first sub-cycle may be a first voltage, and the level of the first driving voltage in the second sub-cycle may be a second voltage.

Mode for Invention

Reference will now be made in detail to the preferred embodiments, examples of which are illustrated in the accompanying drawings. While the disclosure is subject to various modifications and alternative forms, specific embodiments thereof are shown by way of example in the drawings. However, the disclosure should not be construed as being limited to the embodiments set forth herein, but on the contrary, the disclosure covers all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element without necessarily requiring or involving any physical or logical relationship or sequence between such subjects or elements.

FIG. 1 shows an example of a camera module according to an embodiment.

Referring to FIG. 1, the camera module 10 may include a lens assembly 22, which includes a liquid lens and a plurality of lenses, a control circuit 24, and an image sensor 26.

The liquid lens may include a conductive liquid, a non-conductive liquid, a first plate, and an electrode unit. The first plate may include a cavity formed therein to accommodate the conductive liquid and the non-conductive liquid. The electrode unit may be electrically connected to an external power source to receive voltage so as to change an interface between the conductive liquid and the non-conductive liquid. The liquid lens may further include an insulation layer, which is disposed on the electrode unit to prevent contact between the electrode and the non-conductive liquid.

The camera module, to which the liquid lens is applied, may include a control unit for controlling the voltage applied to the electrode unit. The electrode unit may include a first electrode and a second electrode, and each of the first electrode and the second electrode may include at least one electrode sector. The first electrode and the second electrode may electromagnetically interact with each other to change the interface between the conductive liquid and the non-conductive liquid.

The lens assembly 22 may include a plurality of lenses. The lens assembly 22 may be include a plurality of lenses in which a liquid lens is included, and the focal length of the liquid lens may be adjusted in response to the driving voltage applied to the first electrode and the second electrode. The camera module 10 may further include a control circuit 24 for supplying a driving voltage to the liquid lens. The first electrode may be an individual electrode, and the second electrode may be a conductive metal plate, and may be a common electrode. Here, the first electrode may be n individual electrodes (n being an integer of 2 or greater).

The camera module 10 may include a plurality of circuits 24 and 26, disposed on a single printed circuit board (PCB), and a lens assembly 22, including a plurality of lenses. However, this is merely illustrative, and the scope of the disclosure is not limited thereto. The configuration of the control circuit 24 may be designed differently in accordance with the specifications required for an optical device. In particular, in order to reduce the intensity of the operating voltage applied to the lens assembly 22, the control circuit 24 may be implemented as a single chip. As a result, it is possible to further reduce the size of the optical device that is mounted in a portable device.

FIG. 2 shows an example of the lens assembly 22 included in the camera module 10.

The camera module 10 may be included in an optical device. The optical device may include a housing, in which at least one of a camera module, a display unit, a communication module, a memory storage unit, or a battery is mounted.

Referring to FIG. 2, the lens assembly 22 may include a first lens unit 100, a second lens unit 150, a liquid lens 300, a holder 400, and a connection unit 500.

One or two or more connection units 500 may be provided. For example, in the case in which one connection unit is provided, a part of the connection unit may be disposed on or under the liquid lens 300 so as to be connected to the liquid lens 300. In the case in which two connection units are provided, the connection units may include a first connection unit connected to the upper side of the liquid lens 300 and a second connection unit connected to the lower side of the liquid lens. One end of the connection unit may be electrically connected to the substrate, which is disposed under the lens assembly 22 and on which the image sensor 26 is mounted and disposed. The illustrated structure of the lens assembly 22 is just one example, and the structure of the lens assembly 22 may be changed depending on the specifications required for an optical device. For example, in the illustrated example, the liquid lens 300 is disposed between the first lens unit 100 and the second lens unit 150. However, in another example, the first lens unit or the second lens unit may be omitted. Alternatively, the liquid lens 300 may be disposed above the first lens unit 100 (or on the front surface of the first lens unit), or may be disposed below the second lens unit. The liquid lens 300 may include a cavity, which is defined by an open region. In another example, the liquid lens 300 may be disposed such that the direction in which the cavity 310 is inclined is the reverse of the direction shown in FIG. 2. That is, the open area of the portion of the cavity 310 on which light is incident may be smaller than the open area of the portion opposite thereto. When the liquid lens 300 is disposed such that the direction in which the cavity 310 is inclined is reversed, the arrangement of all or some of the components of the liquid lens, such as the electrodes and the liquid, may be changed in accordance with the direction of inclination of the liquid lens. Alternatively, only the direction in which the cavity is inclined may be changed, but the arrangement of the other components of the liquid lens may not be changed.

The first lens unit 100 is disposed at the front side of the lens assembly 22, and receives light from the outside of the lens assembly 22. The first lens unit 100 may include at least one lens, or two or more lenses may be aligned along a center axis PL to form an optical system.

The first lens unit 100 and the second lens unit 150 may be mounted in the holder 400. Here, a through-hole may be formed in the holder 400, and the first lens unit 100 and the second lens unit 150 may be disposed in the through-hole. Further, the liquid lens 300 may be inserted into the space between the first lens unit 100 and the second lens unit 150 in the holder 400.

Meanwhile, the first lens unit 100 may include an exposure lens 110. The exposure lens 110 may protrude to the outside of the holder 400 so as to be exposed to the outside. In the case of the exposure lens 110, the lens surface thereof may be damaged due to exposure to the outside. If the lens surface is damaged, the quality of an image captured by the camera module may be deteriorated. In order to prevent or suppress damage to the surface of the exposure lens 110, a method of disposing a cover glass, a method of forming a coating layer, or a method of forming the exposure lens 110 using a wear-resistant material for preventing damage to the surface of the exposure lens may be applied.

The second lens unit 150 may be disposed at the rear of the first lens unit 100 and the liquid lens 300, and the light incident on the first lens unit 100 from the outside may pass through the liquid lens 300 and may be incident on the second lens unit 150. The second lens unit 150 may be spaced apart from the first lens unit 100, and may be disposed in the through-hole formed in the holder 400.

Meanwhile, the second lens unit 150 may include at least one lens, and when two or more lenses are included, the lenses may be aligned along the center axis PL to form an optical system.

The liquid lens 300 may be disposed between the first lens unit 100 and the second lens unit 150, and may be inserted into an insertion hole 410 formed in the holder 400. The liquid lens 300 may also be aligned along the center axis PL in the same manner as the first lens unit 100 and the second lens unit 150. One or two or more insertion holes 410 may be formed in the side surface of the holder 400. The liquid lens may be disposed in the insertion hole 410. The liquid lens may be disposed so as to protrude to the outside of the insertion hole 410.

The liquid lens 300 may include a cavity 310 formed therein. The cavity 310 may be a region that light that has passed through the first lens unit 100 penetrates, and may include a liquid in at least a portion thereof. For example, two kinds of liquid, i.e. a conductive liquid and a non-conductive liquid (or an insulation liquid), may be included in the cavity 310, and the conductive liquid and the non-conductive liquid may form an interface therebetween without being mixed with each other. The interface between the conductive liquid and the non-conductive liquid may be deformed by a driving voltage applied thereto through the connection unit 500, whereby the curvature of the interface of the liquid lens 300 and/or the focal length of the liquid lens may be changed. When the deformation of the interface and the change in the curvature thereof are controlled, the liquid lens 300, the lens assembly 22 including the same, and the optical device may perform an auto-focusing (AF) function, a handshake compensation or optical image stabilization (OIS) function, etc.

FIG. 3 is a block diagram schematically showing the camera module shown in FIG. 1.

FIG. 3 illustrates a control circuit 210 and a lens assembly 250, which are included in the camera module 200, and the control circuit 210 and the lens assembly 250 may respectively correspond to the control circuit 24 and the lens assembly 22 shown in FIG. 1.

The control circuit 210 may include a control unit 220.

The control unit 220 is a part for performing an AF function and an OIS function. The control unit 220 may control the liquid lens module 260 included in the lens assembly 250 in response to a user request or using a sensing result (e.g. a motion signal of a gyro sensor 225, etc.).

The control unit 220 may include a controller 230 and a voltage driver 235. The gyro sensor 225 may be provided separately from the control unit 220, or may be included in the control unit 220.

The gyro sensor 225 may sense an angular velocity of motion in two directions, namely a yaw-axis direction and a pitch-axis direction, in order to compensate for hand tremor in the upward-and-downward direction and the leftward-and-rightward direction of the optical device 200. The gyro sensor 225 may generate a motion signal corresponding to the sensed angular velocity, and may provide the motion signal to the controller 230.

In order to realize an OIS function, the controller 230 may extract only a desired band by removing a high-frequency noise component from a motion signal using a low pass filter (LPF), may calculate the amount of hand tremor using the noise-removed motion signal, and may calculate a driving voltage corresponding to the shape that the liquid lens 280 of the liquid lens module 260 needs to have in order to compensate for the calculated amount of hand tremor.

The controller 230 may receive information (i.e. information about the distance to an object) for performing an AF function from the inside (e.g. an image sensor) or the outside (e.g. a distance sensor) of the optical device or the camera module 200, and may calculate a driving voltage corresponding to the shape that the liquid lens 280 needs to have in accordance with the focal length for focusing the lens on the object using the distance information.

The controller 230 may store a driving voltage table in which a driving voltage and a driving voltage code for causing the voltage driver 235 to generate the driving voltage are mapped, and may obtain a driving voltage code corresponding to the calculated driving voltage with reference to the driving voltage table.

The voltage driver 235 may receive a digital-type driving voltage code from the controller 230, may generate an analog-type driving voltage corresponding to the received driving voltage code, and may provide the analog-type driving voltage to the lens assembly 250.

The voltage driver 235 may include a voltage booster for receiving a supply voltage (e.g. voltage supplied from a separate power supply circuit) and increasing a voltage level, a voltage stabilizer for stabilizing the output of the voltage booster, and a switching unit for selectively supplying the output of the voltage booster to respective terminals of the liquid lens 280.

Here, the switching unit may include a circuit called an H-bridge. High voltage output from the voltage booster is applied to the switching unit as a power supply voltage. The switching unit may selectively supply the applied power supply voltage and a ground voltage across the two ends of the liquid lens 280. Here, the liquid lens 280 may include a first electrode, including four electrode sectors, and a second electrode, including one electrode sector, to realize driving.

The two ends of the liquid lens 280 may respectively correspond to the first electrode and the second electrode. Alternatively, the two ends of the liquid lens 280 may respectively correspond to any one of the four electrode sectors of the first electrode and the one electrode sector of the second electrode.

A pulse-type voltage having a predetermined width may be applied to each electrode sector of the liquid lens 280, and the driving voltage applied to the liquid lens 280 may be the difference between the voltages applied to the first electrode and the second electrode. Here, the voltage applied to the first electrode may be defined as an individual voltage, and the voltage applied to each of the electrode sectors of the second electrode may be defined as an individual voltage.

That is, in order to cause the voltage driver 235 to control the driving voltage applied to the liquid lens 280 in accordance with the digital-type driving voltage code supplied from the controller 230, the voltage booster controls the increase in the voltage level, and the switching unit controls the phase of the pulse voltage applied to the common electrode and the individual electrode, whereby an analog-type driving voltage corresponding to the driving voltage code is generated.

That is, the control unit 220 may control the voltages applied to the first electrode and the second electrode.

The control circuit 210 may further include a connector (not shown) that performs a communication or interface function of the control circuit 210. For example, the connector may perform communication protocol conversion in order to realize communication between the control circuit 210, which uses an inter-integrated circuit (I²C) communication scheme, and the lens assembly 250, which uses a mobile industry processor interface (MIPI) communication scheme.

Further, the connector may receive power from an external device (e.g. a battery), and may supply power required for the operation of the control unit 220 and the lens assembly 250.

The lens assembly 250 may include a liquid lens module 260, and the liquid lens module 260 may include a driving voltage supply unit 270 and a liquid lens 280.

The driving voltage supply unit 270 may receive a driving voltage (i.e. an analog voltage applied between any one of the four individual electrodes and the one common electrode) from the voltage driver 235, and may supply the driving voltage to the liquid lens 280. The driving voltage supply unit 270 may include a voltage-adjusting circuit or a noise-removing circuit for compensating for loss due to terminal connection between the control circuit 210 and the lens assembly 250, or the output voltage may bypass the driving voltage supply unit 270.

The driving voltage supply unit 260 may be disposed on a flexible printed circuit board (FPCB) or a first substrate, which constitutes at least a part of the connection unit 500 shown in FIG. 2. However, the scope of the disclosure is not limited thereto. The connection unit 500 may include the driving voltage supply unit 260.

With the deformation of the interface between the conductive liquid and the non-conductive liquid in accordance with the driving voltage, the liquid lens 280 may perform an AF function or an OIS function.

FIG. 4 shows a liquid lens, the interface of which is adjusted in response to a driving voltage. Specifically, FIG. 4(a) shows a liquid lens 28 included in the lens assembly 250 (refer to FIG. 3), and FIG. 4(b) shows an equivalent circuit of the liquid lens 28. Here, the liquid lens 28 corresponds to the liquid lens 280 shown in FIG. 3.

First, referring to FIG. 4(a), the liquid lens 28, the interface of which is adjusted in response to a driving voltage, may receive a driving voltage via a plurality of electrode sectors L1, L2, L3 and L4 of the first electrode, which are disposed at the same angular interval from each other in four different directions, and the electrode sector C0 of the second electrode. When the driving voltage is applied to the liquid lens via the electrode sectors L1, L2, L3 and L4 of the first electrode and the electrode sector C0 of the second electrode, the interface between the conductive liquid and the non-conductive liquid disposed in the cavity 310 may be deformed. The degree and shape of deformation of the interface between the conductive liquid and the non-conductive liquid may be controlled by the controller 230 in order to realize an AF function or an OIS function.

Further, referring to FIG. 4(b), the lens 28 may be defined as a plurality of capacitors 30, one side of each of which receives voltage from a corresponding one of the electrode sectors L1, L2, L3 and L4 of the first electrode, and the other side of each of which is connected to the electrode sector C0 of the second electrode to receive voltage therefrom.

Although an embodiment in which four different electrode sectors are provided is described by way of example, the scope of the disclosure is not limited thereto.

FIG. 5 is a view showing an example of the voltage supplied to both ends of a liquid lens.

Referring to FIG. 5, a pulse-shaped voltage having a predetermined width may be applied to each of the electrode sectors C0 and L1 to L4 of the liquid lens 280, and the difference in the voltage between each of the electrode sectors L1 to L4 of the first electrode and the electrode sector C0 of the second electrode becomes a driving voltage.

The voltage driver 235 may control the driving voltage corresponding to each individual electrode by controlling the phase of the pulse voltage applied to the common electrode sector and the individual electrode sectors.

The voltage driver 235 may shift the phase of the pulse voltage in accordance with an operation clock supplied from the outside. FIG. 5 shows a first pulse voltage A and a second pulse voltage B that are applied to the individual electrode sector L1. The second pulse voltage B is a voltage obtained by delaying the first pulse voltage A by a minimum phase.

The level of the driving voltage 2 that is generated when the second pulse voltage B is applied to the individual electrode sector L1 is higher than the level of the driving voltage 1 that is generated when the first pulse voltage A is applied to the individual electrode sector L1. Here, the root mean square (RMS) value of the driving voltage directly contributes to the control of the interface of the liquid lens 280.

The minimum phase is determined by the frequency of the operating clock that the voltage driver 235 receives. The minimum phase may determine the resolution of the output voltage of the voltage driver 235. When the minimum phase decreases, the resolution of the output voltage of the voltage driver 235 may increase.

However, if it is desired to double the resolution of the output voltage of the voltage driver 235, the voltage driver 235 needs to receive the operating clock having a doubled frequency, and thus a high-performance clock generator is required. This leads to considerable loss in terms of cost, power consumption, and the like throughout the entire system. Therefore, a method of increasing the resolution of the output voltage of the voltage driver 235 without the necessity for a high-performance clock generator is required.

FIG. 6 is a view showing a method of applying a voltage to a liquid lens according to an embodiment.

In FIG. 6 and the drawings below, a driving voltage application method will be described as being performed to provide an auto-focusing function. However, the scope of the disclosure is not limited thereto. The same technical idea may also be applied to the provision of an OIS function. Further, the level and the timing of the voltage applied to the liquid lens, which will be described below with reference to FIG. 6 and the drawings below, may be controlled by the driving voltage code generated by the controller 230.

Four liquid lenses are illustrated for each of cycles CYCLE1 to CYCLE4. An electrode sector of the first electrode, which is located on the left-upper side of one liquid lens, is defined as a first electrode sector, and electrode sectors, which are sequentially located from the first electrode sector in the clockwise direction with respect to the center (the optical axis or the circumference) of the liquid lens, are respectively defined as a second electrode sector, a third electrode sector, and a fourth electrode sector.

Further, each of the first to fourth driving electrodes is a combination of a corresponding individual electrode sector of the first to fourth electrode sectors and the common electrode sector of the second electrode. The driving voltages applied to the first to fourth driving electrodes are respectively defined as first to fourth driving voltages.

Each of the first to fourth driving voltages corresponds to the difference between a corresponding one of the first to fourth voltages applied to the first to fourth electrode sectors and the voltage applied to the second electrode. Each of the first to fourth driving voltages may be an average value or an RMS value of this voltage difference in each cycle.

Further, a unit cycle for deforming the interface of the liquid lens may be defined, and each of the first to fourth cycles CYCLE1 to CYCLE4 shown in FIG. 6 corresponds to the unit cycle.

A time corresponding to the unit cycle may be determined in consideration of an auto-focusing response time, i.e. the time required for the liquid lens to be deformed to a desired interface after application of the driving voltage. The auto-focusing response time may vary depending on the specifications of the liquid lens. The auto-focusing response time may be about 50 ms. The unit cycle may be determined in consideration of the auto-focusing response time and the number of sub-cycles.

The controller 230 shown in FIG. 3 may calculate a driving voltage, and may transmit the driving voltage code to the voltage driver 235 through a bidirectional serial data port (SDA) and a clock port (SCL) in an I²C manner, which may support up to 1 Mhz.

The voltage driver 235 may generate a driving voltage corresponding to the driving voltage code based on the driving voltage code received from the controller 230. The driving voltage includes first to fourth driving voltages, each of which is a both-end voltage applied to a respective capacitor 30 shown in FIG. 4. In order to apply the driving voltage, the voltages of the first to fourth electrode sectors of the first electrode and the voltage of the second electrode may be generated in practice.

Each of the first to fourth driving voltages includes a maximum output voltage, a minimum output voltage, and a predetermined unit voltage according to the structure of the voltage driver 235. The maximum output voltage and the minimum output voltage are voltages that the voltage driver 235 is capable of outputting at a maximum and a minimum, and the unit voltage is a minimum voltage by which each of the first to fourth driving voltages is increased or decreased.

In the case in which the voltage driver 235 adjusts the output voltage in a manner of shifting the phase of the pulse voltage in accordance with the operating clock, the unit voltage may be determined based on a minimum phase determined in accordance with the frequency of the operating clock.

However, each of the first to fourth driving voltages is not necessarily increased or decreased by 1 V, but may be increased or decreased by, for example, 10 V.

For example, when the maximum output voltage is 70 V, when the minimum output voltage is 41 V, and when the unit voltage is 1 V, each of the first to fourth voltages may have 30 values within a range of 41 V to 70 V.

That is, on the assumption that the same driving voltage is applied to the first to fourth driving electrodes to perform an auto-focusing function, the auto-focusing resolution may be realized in 30 stages.

In this case, a $k^{th}$ (k being an integer of 1 to N; N being an integer of 2 or greater) driving voltage Vk is expressed using Equation 1 below. Here, the $k^{th}$ driving voltage is an arbitrary driving voltage determined on the assumption that the minimum output voltage is the first driving voltage and that the maximum output voltage is the $N^{th}$ driving voltage.

$$Vk = Vi + dv * k \qquad \text{[Equation 1]}$$

Here, Vi denotes the minimum output voltage, and dv denotes the unit voltage.

Thus, if the same driving voltage is applied to the first to fourth driving electrodes within a constant output voltage range (from the maximum output voltage to the minimum output voltage), the unit voltage for the driving voltage is the same as the unit voltage of the voltage driver 235, and the auto-focusing resolution depends on the unit voltage of the voltage driver 235. The auto-focusing resolution serves as a reference for determining the degree to which an auto-focusing function is precisely adjusted, and thus is the most important factor that influences the performance of the auto-focusing function.

Hereinafter, a driving voltage applying method capable of increasing the auto-focusing resolution within a constant output voltage range will be described.

Although not shown in FIG. 6, it is assumed that, in the initial cycle before the first cycle CYCLE1, each of the individual voltages applied to the first to fourth electrode sectors has an intensity of V (V being an arbitrary voltage within an output voltage range, hereinafter referred to as an "initial voltage").

As shown in FIG. 6, each cycle CYCLE1 to CYCLE4 may be divided into four sub-cycles. The sub-cycles may have the same time period as each other, or may have different time periods from each other. In an embodiment in which the sub-cycles have the same time period as each other, if each cycle CYCLE1 to CYCLE4 has a time period of 50 ms, each sub-cycle may have a time period of 12.5 ms. The voltage applied to each driving electrode in one sub-cycle may be maintained. According to another embodiment, the voltage applied to each driving electrode in one sub-cycle may be varied. For example, in the second cycle CYCLE2, the first and second cycles may be grouped into one sub-cycle, and the third and fourth cycles may be grouped into one sub-cycle. In this case, each sub-cycle may have a time period of 25 ms.

In the first cycle CYCLE1, (V+dv, V, V, V) may be applied in the first sub-cycle, (V, V+dv, V, V) may be applied in the second sub-cycle, (V, V, V+dv, V) may be applied in the third sub-cycle, and (V, V, V, V+dv) may be applied in the fourth sub-cycle. Here, a, b, c, and d in (a, b, c, d) respectively denote the first to fourth driving voltages.

That is, in the first sub-cycle of the first cycle CYCLE1, the voltage (V+dv, hereinafter referred to as a "second voltage"), which is obtained by increasing the initial voltage by the unit voltage, may be applied as one of the first to fourth driving voltages, and the initial voltage (V, hereinafter referred to as a "first voltage") may be applied as the remaining driving voltages. In the subsequent sub-cycles, the position to which the second voltage is applied may be changed sequentially in the clockwise direction. Here, the driving electrode to which the second voltage is applied is indicated as a shaded portion. The clockwise direction is just one example, and a counterclockwise direction, a zigzag direction, or the like may also be applied to the embodiment.

In this specification, the operation of applying the first voltage or the second voltage as any one of the first to fourth driving voltages in any one sub-cycle may mean that any one driving voltage has a level corresponding to the first voltage or the second voltage. Here, the first to fourth driving voltages may have two voltage levels in any one unit cycle. However, the scope of the disclosure is not limited thereto.

Further, the second voltage may be higher than the first voltage.

The positions to which the second voltage is applied in the respective sub-cycles need to be different from each other. This is because the interface of the liquid lens may become uneven if the second voltage is continuously applied to any one position.

The driving voltage applied to any one driving electrode in any one cycle corresponds to the average of the driving voltages applied in the four sub-cycles.

Thus, the first to fourth driving voltages applied in the first cycle CYCLE1 correspond to (4V+dv)/4=V+dv/4.

In the second cycle CYCLE2, (V+dv, V, V+dv, V) may be applied in the first sub-cycle, (V, V+dv, V, V+dv) may be applied in the second sub-cycle, (V+dv, V, V+dv, V) may be applied in the third sub-cycle, and (V, V+dv, V, V+dv) may be applied in the fourth sub-cycle.

That is, in the first sub-cycle of the second cycle CYCLE2, the second voltage may be applied as two of the first to fourth driving voltages, and the first voltage may be applied as the remaining driving voltages. In the second sub-cycle, the second voltage may be applied to the positions, to which the first voltage has been applied, and the first voltage may be applied to the positions, to which the second voltage has been applied. In the subsequent sub-cycles, the driving voltage applying method in the first sub-cycle and the driving voltage applying method in the second sub-cycle may be performed alternately. Like the sub-cycles of the first cycle CYCLE1, the positions to which the voltage is applied in the second cycle CYCLE2 may be changed in the clockwise direction or in the counterclockwise direction.

As shown in FIG. 6, the driving voltages applied to opposite positions are set to be the same as each other, and the positions to which the second voltage is applied in adjacent sub-cycles are set to be different from each other in order to prevent the interface of the liquid lens from becoming uneven. Further, although not shown in the drawing, the application of voltage may be controlled such that the first voltage is applied to two adjacent electrode sectors of the four electrode sectors, such that the second voltage is applied to the remaining electrode sectors, and such that the positions to which the voltage is applied are changed in the clockwise direction or in the counterclockwise direction.

In other words, when any one sub-cycle is completed and a subsequent sub-cycle is performed, at least one of the individual electrodes may receive a changed level of driving voltage.

The first to fourth driving voltages applied in the second cycle CYCLE2 correspond to (4V+2 dv)/4=V+dv/2.

In the third cycle CYCLE3, (V+dv, V+dv, V+dv, V) may be applied in the first sub-cycle, (V, V+dv, V+dv, V+dv) may be applied in the second sub-cycle, (V+dv, V, V+dv, V+dv) may be applied in the third sub-cycle, and (V+dv, V+dv, V, V+dv) may be applied in the fourth sub-cycle.

That is, in the first sub-cycle of the third cycle CYCLE3, the second voltage may be applied as three of the first to fourth driving voltages, and the first voltage may be applied as the remaining driving voltage. In the subsequent sub-cycles, the position to which the first voltage is applied may be changed sequentially in the clockwise direction. Here, the clockwise direction is just one example, and a counterclockwise direction, a zigzag direction, or the like may also be applied to the embodiment.

The positions to which the first voltage is applied in the respective sub-cycles need to be different from each other. This is because the interface of the liquid lens may become uneven if the first voltage is continuously applied to any one position.

Thus, the first to fourth driving voltages applied in the third cycle CYCLE5 correspond to (4V+3 dv)/4=V+3 dv/4.

In the fourth cycle CYCLE4, (V+dv, V+dv, V+dv, V+dv) may be applied in the first sub-cycle, (V+dv, V+dv, V+dv, V+dv) may be applied in the second sub-cycle, (V+dv, V+dv, V+dv, V+dv) may be applied in the third sub-cycle, and (V+dv, V+dv, V+dv, V+dv) may be applied in the fourth sub-cycle.

That is, in the first to fourth sub-cycles of the fourth cycle CYCLE4, the second voltage may be applied as all of the first to fourth driving voltages.

Thus, the first to fourth driving voltages applied in the fourth cycle CYCLE4 correspond to (4V+4 dv)/4=V+dv.

Here, in one unit cycle, the sum of the first to fourth driving voltages applied in each sub-cycle may be maintained at a constant level. This is because, when the sum of the first to fourth driving voltages in one cycle is maintained at a constant level, a specific focal length may be maintained in the corresponding cycle.

According to the driving voltage applying method of an embodiment, the $k^{th}$ individual voltage V'k is expressed using Equation 2 below.

$$V'k = Vi + dv/4 * k \quad \text{[Equation 2]}$$

Here, Vi denotes the minimum output voltage, and dv denotes the unit voltage.

Thus, within a constant output voltage range, the first to fourth driving voltages may not be applied as the same driving voltage. After the cycle in which all of the first to fourth driving voltages are set to the first voltage, a cycle in which only one of the first to fourth driving voltages is set to the second voltage and the driving voltage set to the second voltage is applied by rotation, a cycle in which only two of the first to fourth driving voltages are set to the second voltage and the driving voltages set to the second voltage are applied by rotation, and a cycle in which only three of the first to fourth driving voltages are set to the second voltage and the driving voltages set to the second voltage are applied by rotation are further performed, whereby the unit voltage determining the auto-focusing resolution may be changed from dv to dv/4.

The reduction of the unit voltage to ¼ means a four-fold increase in the auto-focusing resolution. That is, the performance of the auto-focusing function may be greatly improved.

For example, since the maximum output voltage is 70V, the minimum output voltage is 41V, and the unit voltage is 0.25V, each of the first to fourth driving voltages may have 120 values within a range of 41 V to 70 V.

According to another embodiment, it is also possible to use only some of the cycles shown in FIG. 5. For example, when only the voltage applying method according to the second cycle CYCLE2 of the first to third cycles CYCLE1 to CYCLE3, the auto-focusing resolution may be doubled.

Further, in this specification, the sub-cycle in which the level of the first driving voltage is the first voltage may be defined as the first sub-cycle, and the sub-cycle in which the level of the second driving voltage is the second voltage may be defined as the second sub-cycle.

FIG. 7 is a view showing a method of applying a voltage to a liquid lens according to the embodiment shown in FIG. 6 in terms of one driving electrode.

FIG. 7 shows a driving voltage applied to a driving electrode corresponding to the first electrode sector L1 in each cycle CYCLE0 to CYCLE4.

The driving voltage indicated as a white portion denotes a section in which the first voltage V is applied, and the driving voltage indicated as a shaded portion denotes a section in which the second voltage V+dv, which is higher than the first voltage V by the unit voltage due to a shift of the voltage applied to the first electrode sector L1 by the minimum phase, is applied.

Each cycle CYCLE0 to CYCLE4 may be divided into four sub-cycles SUB1 to SUB4.

In the initial cycle CYCLE0, the first voltage V may be applied to the first driving electrode in all of the sub-cycles SUB1 to SUB4. Thus, the first driving voltage applied to the first driving electrode in the initial cycle CYCLE0 corresponds to V.

In the first cycle CYCLE1, the second voltage V+vd may be applied to the first driving electrode in one sub-cycle SUB1 of the sub-cycles SUB1 to SUB4, and the first voltage V may be applied in the remaining sub-cycles SUB2 to SUB4. Thus, the first driving voltage applied to the first driving electrode in the first cycle CYCLE1 corresponds to V+dv/4.

In the second cycle CYCLE2, the second voltage V+vd may be applied to the first driving electrode in two sub-cycles SUB1 and SUB2 of the sub-cycles SUB1 to SUB4, and the first voltage V may be applied in the remaining sub-cycles SUB3 and SUB4. Thus, the first driving voltage applied to the first driving electrode in the second cycle CYCLE2 corresponds to V+dv/2.

In the third cycle CYCLE3, the second voltage V+vd may be applied to the first driving electrode in three sub-cycles SUB1 to SUB3 of the sub-cycles SUB1 to SUB4, and the first voltage V may be applied in the remaining sub-cycle SUB4. Thus, the first driving voltage applied to the first driving electrode in the third cycle CYCLE3 corresponds to V+3 dv/4.

In the fourth cycle CYCLE4, the second voltage V+dv may be applied to the first driving electrode in all of the sub-cycles SUB1 to SUB4. Thus, the first driving voltage applied to the first driving electrode in the fourth cycle CYCLE4 corresponds to V+dv.

Here, in the cycles CYCLE1 to CYCLE3 in which different driving voltages are applied to each driving electrode, the number of sub-cycles in which the first voltage and the second voltage are applied to any one driving electrode needs to be the same for all of the driving electrodes. However, it is possible to determine a sub-cycle in which the first voltage and the second voltage are being applied to any one driving electrode using various methods.

For example, as described with reference to FIG. 6, the position of the driving electrode to which the first voltage or the second voltage is applied may be changed in the clockwise direction, in the counterclockwise direction, or in the zigzag direction in adjacent sub-cycles.

The position of the sub-cycle in which the second voltage is applied to the first driving electrode is slightly different from that shown in FIG. 6. However, this is merely for convenience of description, and does not depart from the scope of the technical idea of the disclosure.

FIG. 8 is a view showing the effects of the driving voltage applying method according to the embodiment.

FIG. 8 illustrates the average voltage applied to the electrode sectors in each cycle CYCLE0 to CYCLE4 shown in FIGS. 6 and 7.

The average voltage applied to the first to fourth driving electrodes in the initial cycle CYCLE0 is V, the average voltage applied to the first to fourth driving electrodes in the first cycle CYCLE1 is V+dv/4, the average voltage applied to the first to fourth driving electrodes in the second cycle CYCLE2 is V+dv/2, the average voltage applied to the first to fourth driving electrodes in the third cycle CYCLE3 is V+3 dv/4, and the average voltage applied to the first to fourth driving electrodes in the fourth cycle CYCLE4 is V+dv.

That is, when the driving voltage is gradually increased for each cycle, the driving voltage may be increased by the unit voltage, i.e. dv/4, which corresponds to a value reduced to ¼ of dv, which is the unit voltage of the voltage driver 235.

That is, when the same driving voltage is applied to the first to fourth driving electrodes, the unit voltage with respect to the driving voltage for determining the auto-focusing resolution is the same as the unit voltage of the voltage driver 235. As shown in FIG. 8, when it is desired to gradually increase the driving voltage when the process goes from the initial cycle CYCLE0, in which the driving voltage of V is applied, to the first cycle CYCLE1, the driving voltage of V+dv may be applied, and only one step may be performed.

However, according to the driving voltage applying method shown in FIGS. 6 and 7, the unit voltage with respect to the driving voltage for determining the auto-focusing resolution is ¼ of the unit voltage of the voltage driver 235. As shown in FIG. 8, when it is desired to gradually increase the driving voltage when the process goes from the initial cycle CYCLE0, in which the driving voltage of V is applied, to the first cycle CYCLE1, the driving voltage of V+dv/4 may be applied, and four steps may be performed to apply the driving voltage of V+dv. That is, the method according to the embodiment may realize a four-fold increase in the auto-focusing resolution.

In this specification, a configuration in which the liquid lens includes four individual electrodes is described by way of example. However, the scope of the disclosure is not limited thereto. The embodiment may also be applied to a configuration in which the number of individual electrodes is 8, 16, etc.

For example, when the liquid lens includes eight individual electrodes, one cycle may be divided into eight sub-cycles, and the driving voltage may be applied in such a manner that the number of individual electrodes to which the second voltage is applied is gradually increased. Here, the unit voltage with respect to the driving voltage may be ⅛ of the unit voltage of the voltage driver 235, which may lead to an eight-fold increase in the auto-focusing resolution.

Generalizing the driving voltage applying method, in addition to the cycle in which the first voltage or the second voltage is applied as each of the first to $p^{th}$ (p being an integer of 2 or greater) driving voltages corresponding to the first to $p^{th}$ driving electrodes, P−1 cycles in which the second voltage is applied as q (q being an integer of 1 to p−1) driving voltages of the first to $p^{th}$ driving voltages are further included, which may increase the auto-focusing resolution.

Furthermore, in the cycle in which the second voltage is applied as q driving voltages of the first to $p^{th}$ driving voltages, the second voltage may be applied to any one driving electrode in q sub-cycles.

As described above, according to the driving voltage applying method of the disclosure, it is possible to increase the auto-focusing resolution by reducing the unit voltage with respect to the driving voltage within a constant output voltage range of the voltage driver.

In addition, an increase in the output voltage range of the voltage driver is not required while increasing the auto-focusing resolution, thus leading to a reduction in the amount of power consumed by an optical device.

FIG. 9 is a view showing a method of applying a voltage to a liquid lens according to another embodiment in terms of one driving electrode.

FIG. 9 shows a driving voltage applied to a driving electrode corresponding to the first electrode sector L1 in each cycle CYCLE0 to CYCLE6.

The driving voltage indicated as a white portion denotes a section in which the first voltage V is applied, and the driving voltage indicated as a shaded portion denotes a section in which the second voltage V+dv, which is higher than the first voltage V by the unit voltage due to a shift of the voltage applied to the first electrode sector L1 by the minimum phase, is applied.

Each cycle CYCLE0 to CYCLE6 may be divided into six sub-cycles SUB1 to SUB6.

In the initial cycle CYCLE0, the first voltage V may be applied to the first driving electrode in all of the sub-cycles SUB1 to SUB6. Thus, the first driving voltage applied to the first driving electrode in the initial cycle CYCLE0 corresponds to V.

In the first cycle CYCLE1, the second voltage V+vd may be applied to the first driving electrode in one sub-cycle SUB1 of the sub-cycles SUB1 to SUB6, and the first voltage V may be applied in the remaining sub-cycles SUB2 to SUB6. Thus, the first driving voltage applied to the first driving electrode in the first cycle CYCLE1 corresponds to V+dv/6.

In the second cycle CYCLE2, the second voltage V+vd may be applied to the first driving electrode in two sub-cycles SUB1 and SUB2 of the sub-cycles SUB1 to SUB6, and the first voltage V may be applied in the remaining sub-cycles SUB3 to SUB6. Thus, the first driving voltage applied to the first driving electrode in the second cycle CYCLE2 corresponds to V+dv/3.

In the third cycle CYCLE5, the second voltage V+vd may be applied to the first driving electrode in three sub-cycles SUB1 to SUB3 of the sub-cycles SUB1 to SUB6, and the first voltage V may be applied in the remaining sub-cycles SUB4 to SUB6. Thus, the first driving voltage applied to the first driving electrode in the third cycle CYCLE3 corresponds to V+dv/2.

In the fourth cycle CYCLE4, the second voltage V+vd may be applied to the first driving electrode in four sub-cycles SUB1 to SUB4 of the sub-cycles SUB1 to SUB6, and the first voltage V may be applied in the remaining sub-cycles SUB5 and SUB6. Thus, the first driving voltage applied to the first driving electrode in the fourth cycle CYCLE4 corresponds to V+2 dv/3.

In the fifth cycle CYCLE5, the second voltage V+vd may be applied to the first driving electrode in five sub-cycles SUB1 to SUB5 of the sub-cycles SUB1 to SUB6, and the first voltage V may be applied in the remaining sub-cycle SUB6. Thus, the first driving voltage applied to the first driving electrode in the fifth cycle CYCLE5 corresponds to V+5 dv/6.

In the sixth cycle CYCLE6, the second voltage V+dv may be applied to the first driving electrode in all of the sub-cycles SUB1 to SUB6. Thus, the first driving voltage applied to the first driving electrode in the sixth cycle CYCLE6 corresponds to V+dv.

Here, in the cycles CYCLE1 to CYCLE5 in which different driving voltages are applied to each driving electrode, the number of sub-cycles in which the first voltage and the second voltage are applied to any one driving electrode needs to be the same for all of the driving electrodes. However, it is possible to determine a sub-cycle in which the first voltage and the second voltage are being applied to any one driving electrode using various methods.

For example, as described with reference to FIG. 6, the position of the driving electrode to which the first voltage or the second voltage is applied may be changed in the clockwise direction, in the counterclockwise direction, or in the zigzag direction in adjacent sub-cycles.

Further, like the first cycle CYCLE1 or the fifth cycle CYCLE5, in the case in which the total number (4) of the driving electrodes to which the second voltage or the first voltage is applied is less than the number (6) of the sub-cycles, the first voltage or the second voltage may be identically applied to four driving electrodes in at least two sub-cycles, and the positions of these sub-cycles may be arbitrarily determined so as to minimize the deformation of the interface.

FIG. 10 is a view showing the effects of the driving voltage applying method according to another embodiment.

FIG. 10 illustrates the average voltage applied to the electrode sectors in each cycle CYCLE0 to CYCLE6 shown in FIG. 9.

The average voltage applied to the first to fourth driving electrodes in the initial cycle CYCLE0 is V, the average voltage applied to the first to fourth driving electrodes in the first cycle CYCLE1 is V+dv/6, the average voltage applied to the first to fourth driving electrodes in the second cycle CYCLE2 is V+dv/3, the average voltage applied to the first to fourth driving electrodes in the third cycle CYCLE3 is V+dv/2, the average voltage applied to the first to fourth driving electrodes in the fourth cycle CYCLE4 is V+2 dv/3, the average voltage applied to the first to fourth driving electrodes in the fifth cycle CYCLE5 is V+5 dv/6, and the average voltage applied to the first to fourth driving electrodes in the sixth cycle CYCLE6 is V+dv.

That is, when the driving voltage is gradually increased for each cycle, the driving voltage may be increased by the unit voltage, i.e. dv/6, which corresponds to a value reduced to ⅙ of dv, which is the unit voltage of the voltage driver 235.

That is, when the same driving voltage is applied to the first to fourth driving electrodes, the unit voltage with respect to the driving voltage for determining the auto-focusing resolution is the same as the unit voltage of the voltage driver 235. As shown in FIG. 10, when it is desired to gradually increase the driving voltage when the process goes from the initial cycle CYCLE0, in which the driving voltage of V is applied, to the first cycle CYCLE1, the driving voltage of V+dv may be applied, and only one step may be performed.

However, according to the driving voltage applying method shown in FIG. 9, the unit voltage with respect to the driving voltage for determining the auto-focusing resolution is ⅙ of the unit voltage of the voltage driver 235. As shown in FIG. 10, when it is desired to gradually increase the driving voltage when the process goes from the initial cycle CYCLE0, in which the driving voltage of V is applied, to the first cycle CYCLE1, the driving voltage of V+dv/6 may be applied, and six steps may be performed to apply the driving voltage of V+dv. That is, the method according to the embodiment may realize a six-fold increase in the auto-focusing resolution.

In this specification, a configuration in which the unit cycle for controlling the liquid lens is divided into four or six sub-cycles is described by way of example. However, the scope of the disclosure is not limited thereto. The unit cycle may be divided into eight or ten sub-cycles.

That is, one unit cycle may be divided into X (X being an integer of 2 or greater) sub-cycles, and the number of sub-cycles in which the second voltage is applied to one driving electrode may be changed so that the unit voltage with respect to the driving voltage becomes 1/X of the unit voltage of the voltage driver 235. As a result, it is possible to realize an X-fold increase in the auto-focusing resolution.

In other words, when the unit cycle is divided into X sub-cycles and when the second voltage is applied to one driving electrode in Y sub-cycles, the driving voltage in the corresponding unit cycle may be V+Y*dv/X. That is, if the number of the second sub-cycles of the X sub-cycles is Y in one unit cycle, the average driving voltage in the unit cycle may satisfy the following Equation 3.

Average Driving Voltage in Unit Cycle=First Voltage+(Predetermined Unit Driving Voltage*Y)/X  [Equation 3]

Here, the predetermined unit driving voltage may be a value obtained by subtracting the first voltage from the second voltage, and may also be a minimum unit driving voltage of the voltage driver that is capable of being controlled. However, the scope of the disclosure is not limited thereto.

Equation 3 may be expressed using Equation 4 below.

Average Driving Voltage in Unit Cycle=(First Voltage*(X−Y)+Second Voltage*Y)/X  [Equation 4]

As described above, according to the driving voltage applying method of the disclosure, it is possible to increase the auto-focusing resolution by reducing the unit voltage with respect to the driving voltage within a constant output voltage range of the voltage driver.

In addition, an increase in the output voltage range of the voltage driver is not required while increasing the auto-focusing resolution, thus leading to a reduction in the amount of power consumed by an optical device.

Although only a limited number of embodiments have been described above, various other embodiments are possible. The technical contents of the above-described embodiments may be combined into various forms as long as they are not incompatible with one another, and thus may be implemented in new embodiments.

The above-described liquid lens may be included in a camera module. The camera module may include a lens assembly, which includes a liquid lens mounted in a housing and at least one solid lens disposed on the front surface or the rear surface of the liquid lens, an image sensor, which converts an optical signal transmitted through the lens assembly into an electrical signal, and a control circuit, which supplies a driving voltage to the liquid lens.

In one embodiment, a camera module may include a first plate including a cavity formed therein to accommodate a conductive liquid and a non-conductive liquid, an electrode unit disposed on the first plate and electrically connected to an external power source to change an interface between the conductive liquid and the non-conductive liquid, an insulation unit disposed on the electrode unit to prevent contact with the non-conductive liquid, and a control unit controlling a voltage applied to the electrode unit. The electrode unit may include a first electrode and a second electrode electromagnetically interacting with each other to change the interface between the conductive liquid and the non-conductive liquid, the first electrode may include a plurality of electrode sectors arranged sequentially in a clockwise direction with respect to an optical axis, and the control unit may perform control so as to apply voltages to driving electrodes by rotation in a clockwise direction or in a counterclockwise direction, each of the driving electrodes being a combination of a corresponding one of the plurality of electrode sectors and a common electrode.

The control unit may apply a first voltage to at least one of the driving electrodes, and may apply a second voltage, which has a different intensity from the first voltage, to remaining ones of the driving electrodes.

In another embodiment, a camera module may include a conductive liquid and a non-conductive liquid accommodated in a cavity so as to form an interface therebetween, and $1^{st}$ to $n^{th}$ (n being an integer of 2 or greater) driving electrodes configured to control the interface. $1^{st}$ to $n^{th}$ driving voltages respectively applied to the $1^{st}$ to $n^{th}$ driving electrodes may be controlled in respective cycles, each of which includes n sub-cycles. In each of the n sub-cycles, at least one of the $1^{st}$ to $n^{th}$ driving voltages may be applied as a first voltage, m (m being an integer of 1 to n−1) driving voltages of the $1^{st}$ to $n^{th}$ driving voltages may be applied as a second voltage, and the m driving voltages may be applied as the second voltage by rotation.

The second voltage may be the sum of the first voltage and a unit voltage of a voltage driver supplying a driving voltage to the liquid lens.

Any one of the $1^{st}$ to $n^{th}$ driving voltages may be applied as the second voltage in the m sub-cycles.

At least one of the $1^{st}$ to $n^{th}$ driving voltages may be changed in adjacent ones of the n sub-cycles.

The sum of the $1^{st}$ to $n^{th}$ driving voltages applied in each of the n sub-cycles may be maintained at a constant level.

In still another embodiment, a method of applying a driving voltage to a liquid lens may include applying a first voltage to each of $1^{st}$ to $n^{th}$ (n being an integer of 2 or greater) driving electrodes, applying a second voltage to m (m being an integer of 1 to n−1) driving electrodes of the $1^{st}$ to $n^{th}$ driving electrodes and applying a first voltage to remaining n-m driving electrodes, and applying the second voltage to each of the $1^{st}$ to $n^{th}$ driving electrodes. The applying the second voltage to m driving electrodes of the $1^{st}$ to $n^{th}$ driving electrodes and applying the first voltage to remaining n-m driving electrodes may include applying m driving voltages as the second voltage by rotation.

The second voltage may be the sum of the first voltage and a unit voltage of a voltage driver supplying a driving voltage to the liquid lens.

In the applying m driving voltages of the $1^{st}$ to $n^{th}$ driving voltages as the second voltage, n sub-cycles may be provided, and at least one of the $1^{st}$ to $n^{th}$ driving voltages may be changed in adjacent ones of the n sub-cycles.

Although only a limited number of embodiments have been described above, various other embodiments are possible. The technical contents of the above-described embodiments may be combined into various forms as long as they are not incompatible with one another, and thus may be implemented in new embodiments.

For example, an optical device (or an optical instrument) including a camera module, which includes the liquid lens described above, may be implemented. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include the liquid lens. In addition, the optical device may be implemented in a portable device such as, for example, a smart phone, a laptop computer, or a tablet computer. Such an optical device may include a camera module, a display unit configured to output an image, and a body housing in which the camera module and the display unit are mounted. A communication module, which may communicate with other devices, may be mounted in the body housing of the optical device, and the optical device may further include a memory unit capable of storing data.

It will be apparent to those skilled in the art that various changes in form and details may be made without departing from the spirit and the essential characteristics of the disclosure set forth herein. Accordingly, the above detailed description is not intended to be construed to limit the disclosure in all aspects and to be considered by way of example. The scope of the disclosure should be determined by reasonable interpretation of the accompanying claims and all equivalent modifications made without departing from the disclosure should be included in the following claims.

INDUSTRIAL APPLICABILITY

The present disclosure relates to a lens, which is applicable to a camera module including a liquid lens and to an optical device including the same.

The invention claimed is:
1. A camera module, comprising:
   a first plate comprising a cavity formed therein to accommodate a conductive liquid and a non-conductive liquid;
   an electrode unit disposed on the first plate, the electrode unit being electrically connected to an external power source to change an interface between the conductive liquid and the non-conductive liquid;
   an insulation unit disposed on the electrode unit to prevent contact with the non-conductive liquid; and
   a control unit controlling a voltage applied to the electrode unit,
   wherein the electrode unit comprises a first electrode and a second electrode electromagnetically interacting with each other to change the interface between the conductive liquid and the non-conductive liquid,
   wherein the first electrode comprises a plurality of electrode sectors arranged sequentially in a clockwise direction with respect to an optical axis, and
   wherein the control unit performs control so as to apply voltages to driving electrodes by rotation in a clockwise direction or in a counterclockwise direction, each of the driving electrodes being a combination of a corresponding one of the plurality of electrode sectors and a common electrode.

2. The camera module according to claim 1, wherein the control unit applies a first voltage to at least one of the driving electrodes, and applies a second voltage to remaining ones of the driving electrodes, the second voltage having a different intensity from the first voltage.

3. A camera module, comprising:
   a conductive liquid and a non-conductive liquid accommodated in a cavity, the conductive liquid and the non-conductive liquid forming an interface therebetween; and
   $1^{st}$ to $n^{th}$ (n being an integer of 2 or greater) driving electrodes configured to control the interface,
   wherein $1^{st}$ to $n^{th}$ driving voltages respectively applied to the $1^{st}$ to $n^{th}$ driving electrodes are controlled in respective cycles, each cycle comprising n sub-cycles, and
   wherein, in each of the n sub-cycles, at least one of the $1^{st}$ to $n^{th}$ driving voltages is applied as a first voltage, m (m being an integer of 1 to n−1) driving voltages of the $1^{st}$ to $n^{th}$ driving voltages are applied as a second voltage, and the m driving voltages are applied as the second voltage by rotation.

4. The camera module according to claim 3, wherein the second voltage is a sum of the first voltage and a unit voltage of a voltage driver supplying the $1^{st}$ to $n^{th}$-driving voltage to the liquid lens.

5. The camera module according to claim 3, wherein any one of the $1^{st}$ to $n^{th}$ driving voltages is applied as the second voltage in m sub-cycles.

6. The camera module according to claim 3, wherein at least one of the $1^{st}$ to $n^{th}$ driving voltages is changed in adjacent ones of the n sub-cycles.

7. The camera module according to claim 3, wherein a sum of the $1^{st}$ to $n^{th}$ driving voltages applied in each of the n sub-cycles is maintained at a constant level.

8. A method of applying a driving voltage to a liquid lens, the method comprising:
   applying a first voltage to each of $1^{st}$ to $n^{th}$ (n being an integer of 2 or greater) driving electrodes;
   applying a second voltage to m (m being an integer of 1 to n−1) driving electrodes of the $1^{st}$ to $n^{th}$ driving electrodes and applying a first voltage to remaining n-m driving electrodes; and
   applying the second voltage to each of the $1^{st}$ to $n^{th}$ driving electrodes,
   wherein the applying the second voltage to m driving electrodes of the $1^{st}$ to $n^{th}$ driving electrodes and applying the first voltage to remaining n-m driving electrodes comprises applying m driving voltages as the second voltage by rotation.

9. The method according to claim 8, wherein the second voltage is a sum of the first voltage and a unit voltage of a voltage driver supplying a driving voltage to the liquid lens.

10. The method according to claim 8, wherein, in the applying m driving voltages of the $1^{st}$ to $n^{th}$ driving voltages as the second voltage, n sub-cycles are provided, and at least one of the $1^{st}$ to $n^{th}$ driving voltages is changed in adjacent ones of the n sub-cycles.

11. The camera module according to claim 2, wherein the second voltage is greater than the first voltage.

12. A camera module, comprising:
   a conductive liquid and a non-conductive liquid accommodated in a cavity so as to form an interface therebetween; and n (n being an integer of 2 or greater) individual electrodes and a common electrode configured to control the interface, wherein a first driving voltage, which is applied between the common electrode and any one of the n individual electrodes, is controlled in respective unit cycles, each of which includes a first sub-cycle and a second sub-cycle, wherein a level of the first driving voltage in the first sub-cycle is a first voltage, and wherein a level of the first driving voltage in the second sub-cycle is a second voltage.

13. The camera module according to claim 12, wherein a sum of the number of the first sub-cycles and the number of the second sub-cycles is X (X being an integer of 2 or greater).

14. The camera module according to claim 12, wherein, in one unit cycle, the sum of the driving voltages applied between the n individual electrodes and the common electrode in each of the sub-cycles is maintained at a constant level.

15. The camera module according to claim 13, wherein if the number of the second sub-cycles of the X sub-cycles is Y in one unit cycle, an average driving voltage in the unit cycle satisfies the following equation:

the Average Driving Voltage in the unit Cycle=the first Voltage+(predetermined the unit driving voltage*$Y$)/$X$, where the predetermined unit driving voltage=the second Voltage−the first Voltage            (Equation).

16. The camera module according to claim 12, wherein, when the process goes from the first sub-cycle to the second sub-cycle, which is adjacent to the first sub-cycle, the level of the driving voltage applied to at least one of the n individual electrodes is changed.

17. The camera module according to claim 12, wherein the second voltage is the sum of the first voltage and the predetermined unit voltage.

18. The camera module according to claim 12, wherein the first driving voltage has two voltage levels in one unit cycle.

19. The camera module according to claim 12, wherein the second voltage is higher than the first voltage.

20. A camera module, comprising:
a liquid lens, the liquid lens including:
a conductive liquid and a non-conductive liquid accommodated in a cavity so as to form an interface therebetween; and
n (n being an integer of 2 or greater) individual electrodes and a common electrode configured to control the interface; and
a control circuit controlling a voltage applied to the n individual electrodes and the common electrode,
wherein a first driving voltage, which is applied between the common electrode and any one of the n individual electrodes, is controlled in respective unit cycles, each of which includes a first sub-cycle and a second sub-cycle,
wherein a level of the first driving voltage in the first sub-cycle is a first voltage, and
wherein a level of the first driving voltage in the second sub-cycle is a second voltage.

21. An optical device, comprising:
a camera module of claim 20;
a display unit outputting an image;
a battery supplying power to the camera module; and
a housing in which the camera module, the display unit, and the battery are mounted.

* * * * *